US008774875B1

(12) United States Patent
Halferty et al.

(10) Patent No.: US 8,774,875 B1

(45) Date of Patent: Jul. 8, 2014

(54) SPATIAL SEPARATION-ENABLED NOISE REDUCTION

(75) Inventors: Clark Douglas Halferty, Lee's Summit, MO (US); Andrew Mark Wurtenberger, Olathe, KS (US); Caleb Sisson Hyde, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 766 days.

(21) Appl. No.: 12/908,581

(22) Filed: Oct. 20, 2010

(51) Int. Cl.
*H04B 1/38* (2006.01)

(52) U.S. Cl.
USPC ........ 455/570; 455/41.1; 455/41.2; 455/41.3; 455/501; 455/502; 381/94.1; 381/94.2; 381/94.7; 381/71.1; 381/71.3; 379/392; 379/392.01; 379/406.01; 379/406.03

(58) Field of Classification Search
USPC ......... 379/406.1, 406.8, 392, 392.01, 406.01, 379/406.03; 381/71.6, 74, 86, 94.1, 94.2, 381/94.3, 94.7, 317, 381, 389, 390, 71.1, 381/71.3; 455/41.2, 63.1, 67.3, 114.2, 500, 455/501, 569.1, 569.2, 570, 41.1, 41.3, 502
See application file for complete search history.

(56) References Cited

U.S. PATENT DOCUMENTS

| | | | | |
|---|---|---|---|---|
| 3,644,674 | A * | 2/1972 | Mitchell et al. | 379/392 |
| 7,464,029 | B2 * | 12/2008 | Visser et al. | 704/210 |
| 7,706,821 | B2 * | 4/2010 | Konchitsky | 455/501 |
| 7,983,428 | B2 * | 7/2011 | Ma et al. | 381/94.7 |
| 8,155,335 | B2 * | 4/2012 | Rutschman | 381/74 |
| 2005/0245290 | A1 * | 11/2005 | Lucey et al. | 455/570 |
| 2007/0230712 | A1 * | 10/2007 | Belt et al. | 381/71.1 |
| 2009/0238377 | A1 * | 9/2009 | Ramakrishnan et al. | 381/92 |
| 2009/0279709 | A1 * | 11/2009 | Asada et al. | 381/71.1 |
| 2010/0081487 | A1 * | 4/2010 | Chen et al. | 455/575.1 |

* cited by examiner

*Primary Examiner* — Olumide T Ajibade Akonai

(57) ABSTRACT

Noise reduction is provided to audio captured by a headset by employing spatially separated microphones provided by a headset and a mobile phone. Primary audio is captured by a headset microphone and includes both voice audio and ambient noise. Secondary audio is captured by a mobile phone microphone and includes ambient audio. Noise reduction is performed using the primary and secondary audio to generate a noise-reduce audio.

18 Claims, 2 Drawing Sheets

SPATIAL SEPARATION-ENABLED NOISE REDUCTION

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

Embodiments of the present invention provide for, among other things, reduction of ambient noise for audio from a headset paired with a mobile phone by using two spatially separated microphones. In accordance with embodiments, audio is captured at a headset and transmitted to a mobile phone. The audio from the headset includes the user's voice as well as undesired ambient noise. Audio is also captured using the mobile phone's microphone. The audio from the mobile phone comprises ambient audio. The mobile phone processes the audio from the headset to provide noise reduction by employing the ambient audio from the mobile phone microphone to remove noise from the headset audio and create noise-reduced audio.

Accordingly, in one aspect, an embodiment of the invention is directed to one or more computer storage media storing computer useable instructions that, when used by a mobile phone, cause the mobile phone to perform a method to provide noise reduction to audio from a headset paired with the mobile phone. The method includes receiving primary audio captured from a headset microphone, the primary audio including voice audio and ambient noise. The method also includes receiving secondary audio captured from a mobile phone microphone, the secondary audio including ambient audio. The method further includes employing the primary audio and the secondary audio to generate a noise-reduced audio.

In another aspect of the invention, an embodiment is directed to a method performed by a mobile phone to provide noise reduction to audio from a headset paired with the mobile phone. The method includes turning on a mobile phone microphone in response to input from the headset and setting the gain on the mobile phone microphone. The method also includes capturing ambient audio using the mobile phone microphone. The method further includes receiving headset audio from the headset, the headset audio including voice audio with ambient noise. The method still further includes providing noise reduction to the headset audio using the ambient audio captured by the mobile phone microphone to generate noise-reduced audio.

A further embodiment of the invention is directed to a mobile phone. The mobile phone includes a short-range radio for wirelessly communicating with a headset. The mobile phone also includes a long-range radio for wirelessly communicating with a mobile telecommunications network. The mobile phone further includes a mobile phone microphone for capturing audio. The mobile phone still further includes a noise reducer configured to receive primary audio and secondary audio and to generate a noise-reduced audio using the primary audio and secondary audio, the primary audio having been captured by a headset microphone on the headset and received from the headset via the short-range radio, the secondary audio having been captured by the mobile phone microphone.

BRIEF DESCRIPTION OF THE DRAWINGS

Illustrative embodiments of the present invention are described in detail below with reference to the attached drawing figures, and wherein.

DETAILED DESCRIPTION

Figure 1:
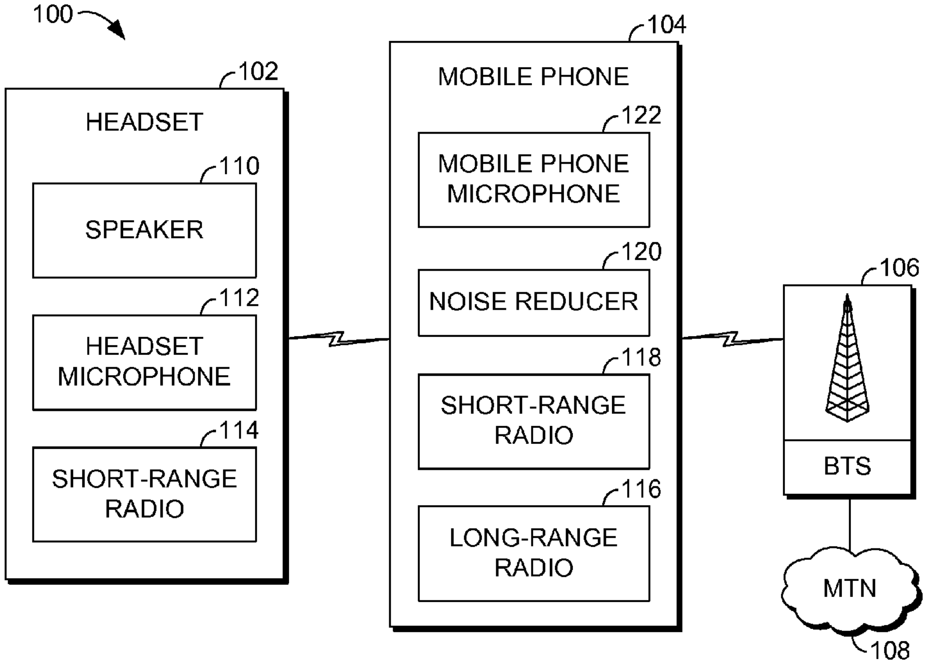
FIG. 1 depicts a block diagram of a headset and mobile phone providing noise reduction for audio from the headset in accordance with an embodiment of the present invention.

Users sometimes employ headsets in conjunction with their mobile phones to facilitate voice calls. A headset includes a microphone and a speaker and may transmit audio signals to and receive audio signals from the user's mobile phone, which in turn communicates with a mobile telecommunications network for voice call purposes. The use of such headsets has continued to grow as the underlying headset technology has improved. For instance, headsets have become more compact and wireless. Bluetooth headsets, in particular, are becoming increasingly more popular. One problem with using such a headset is that the microphone on the headset may capture ambient audio in additional to the user's voice. The ambient audio creates noise that reduces the clarity of the user's voice.

In accordance with embodiments of the present invention, audio captured at a microphone on a mobile phone to which a headset is paired is used to provide noise reduction to audio from the headset. In particular, audio is captured at the headset using a headset microphone. The audio includes the user's voice, as well as undesired ambient noise. The headset audio is transferred to the mobile phone to which the headset is paired. The mobile phone processes the headset audio to provide noise reduction. In particular, the mobile phone captures ambient audio using the mobile phone microphone while the headset captures the headset audio. The mobile phone processes the headset audio and the mobile phone audio to provide noise-reduced audio that includes the user's voice.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| AMPS | Advanced Mobile Phone System |
| BTS | Base Transceiver Station |
| CDMA | Code Division Multiple Access |
| GSM | Global System for Mobile communications (Groupe Spécial Mobile) |
| TDMA | Time Division Multiple Access |

Further, various technical terms are used throughout this description. An illustrative resource that fleshes out various aspects of these terms can be found in Newton's Telecom Dictionary by H. Newton, 25th Edition (2009).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to FIG. 1, a block diagram is shown of an exemplary system 100 in which exemplary embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As shown in FIG. 1, the system 100 may include, among other components, a headset 102, a mobile phone 104, a base transceiver station (BTS) 106, and a mobile telecommunications network 108. The headset 102 may be any type of device configured to be paired with a mobile phone to provide voice capabilities to a user. Among other components not shown, the headset 102 includes a speaker 110, a headset microphone 112, and a short-range radio 114.

The headset 102 communicates with the mobile phone 104 via the short-range radio 114. The short-range radio 114 may communicate with the mobile phone 104 via Bluetooth or other standards for short-range wireless communication. The short-range radio 114 may receive signals from the mobile phone 104, and the headset 102 may process the signals to provide audio that is output by the speaker 110. Additionally, the headset microphone 112 may capture audio which may be processed by the headset 102 and communicated by the short-range radio 114 to the mobile phone 104. Although the system 100 of FIG. 1 illustrates an embodiment in which a wireless link is employed between the headset 102 and mobile phone 104, it should be understood that a wired link may also be employed in some embodiments. In such embodiments, the headset may not require a short-range radio 114.

The mobile device 104 may be any type of device capable of communicating wirelessly with the mobile telecommunications network 108 to provide voice and/or data services to the mobile device 104. To provide wireless service to the mobile device 104, the system 100 may include a BTS 106, which provides a wireless coverage area. The BTS 106 may communicate over a wireless air interface with a long-range radio 116 of the mobile device 104. The communication between the BTS 106 and the mobile device 104 may occur in a digital format, such as CDMA, TDMA, GSM, 3G, or 802.11x, or may occur in an analog format, such as AMPS. Alternatively or additionally, the system 100 may include other network elements for providing mobile device 104 access to the mobile telecommunications network 108.

The mobile phone 104 includes a short-range radio 118 that facilitates communication with the headset 102. As indicated above, the short-range radio 118 of the mobile phone 104 and the short-range radio 114 of the headset may communicate using Bluetooth or other standards for short-range wireless communication. The mobile phone 104 may transmit and receive data, including audio, to and from the headset 102 using the short-range radio 118.

In accordance with embodiments of the present invention, the mobile phone 104 includes a noise reducer 120 to provide noise reduction to audio received from the headset 102. In operation, the mobile phone 104 employs a mobile phone microphone 122 to capture ambient audio when audio is captured by the headset 102. When audio is received from the headset 102, the headset audio is provided to the noise reducer 120. Ambient audio captured by the mobile phone microphone 122 is also provided to the noise reducer 120. The noise reducer 120 processes the headset audio and the ambient audio from the mobile phone microphone 122 to generate noise-reduced audio.

Figure 2:
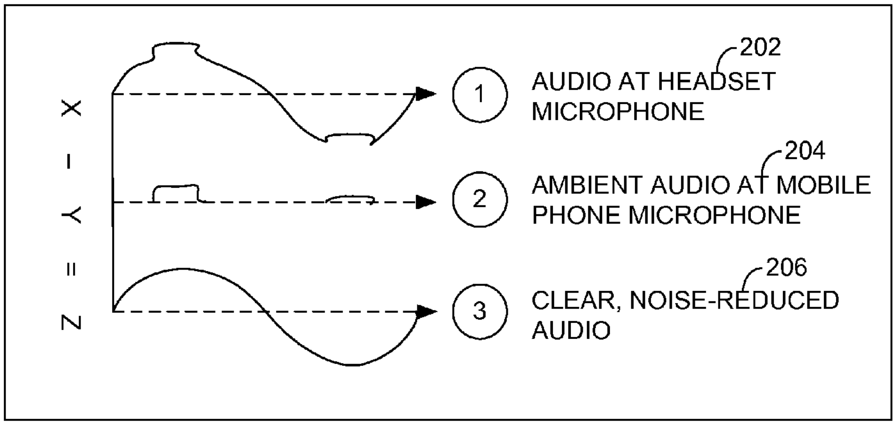
FIG. 2 depicts audio signals collected at a headset and mobile phone and the production of a noise-reduced audio signal.

Any of a variety of different types of noise reduction techniques employing two audio signals may be employed with the scope of embodiments of the present invention. Additionally, noise reduction may be performed on analog or digital signals within various embodiments. By way of example only and not limitation, FIG. 2 illustrates noise reduction that may be provided to headset audio in accordance with an embodiment. As shown in FIG. 2, headset audio 202 is captured by the microphone on a headset. The headset audio 202 includes the user's voice as well as ambient noise. Additionally, mobile phone audio 204 is captured by the microphone on a mobile phone. The mobile phone audio 204 comprises ambient audio. A noise-reduced audio 206 is generated by waveform subtraction of the mobile phone audio 204 (i.e., ambient audio) from the headset audio 206 (i.e., voice audio polluted with ambient noise).

Referring again to FIG. 1, in some embodiments, the noise-reduced audio may be processed by the mobile phone 104 and communicated via the long-range radio 116 to the BTS 106 for transmission via the mobile telecommunications network 108. For instance, the user may be engaged in a voice conversation, and the mobile phone 104 may provide a clearer voice audio that is communicated to the mobile telecommunication network 108 for transmission to another user engaged in the voice conversation.

In some embodiments, the noise-reduced audio generated by the mobile phone 104 may be employed for voice commands or voice data provided to computerized systems instead of for voice communications with other users. For instance, the mobile phone 104 may enable a variety of voice commands in which various actions of the mobile phone 104 may be initiated by voice from the user. Traditionally, one issue of voice commands is the ability of the system to understand the user's voice to identify the voice command issued by the user. Ambient noise may complicate this issue. As such, embodiments of the present invention may provide improved voice command functionality by providing cleaner voice audio from the user that may improve the system's ability to properly recognize the voice command or other voice data provided to the system. This benefit may extend to any computerized system that may be accessed using the mobile phone 104 that may accept a user's voice for voice commands or otherwise entering data.

Figure 3:
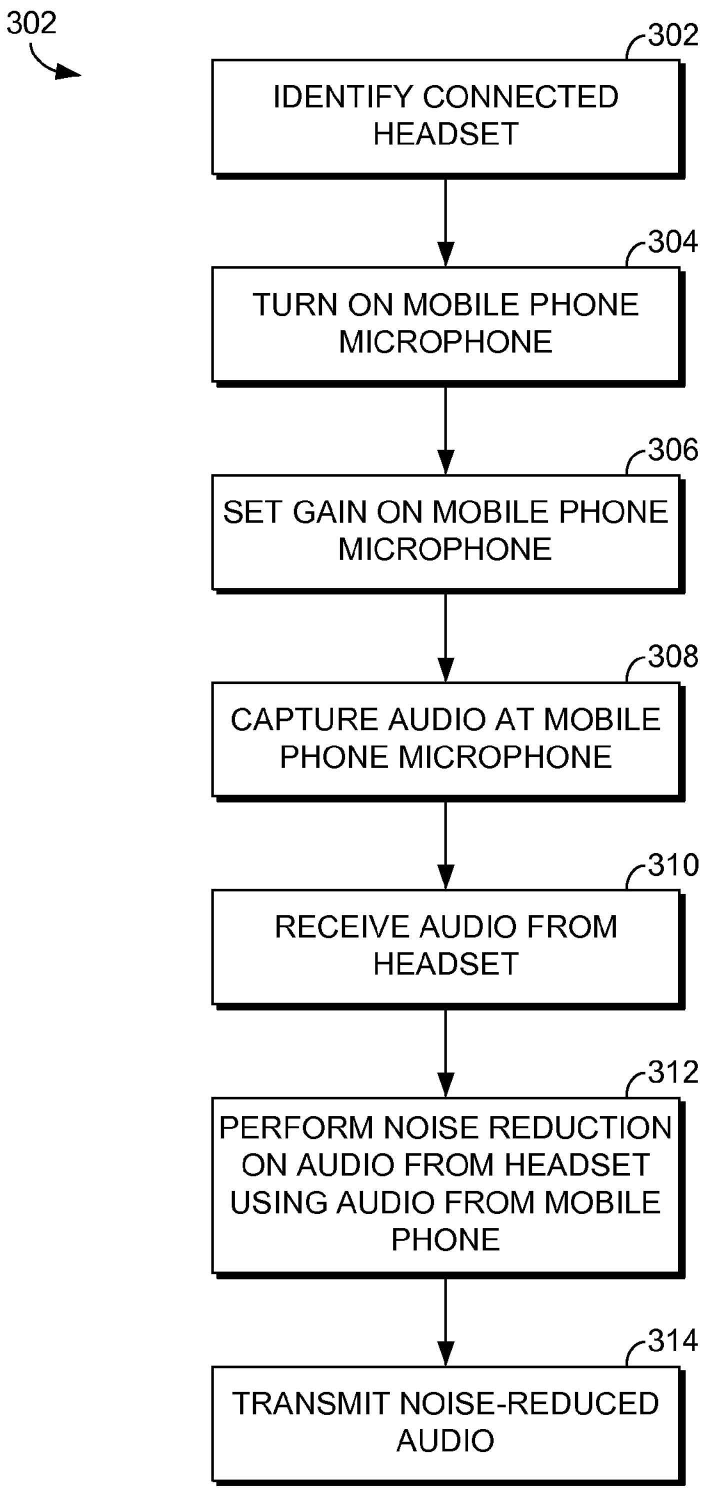
FIG. 3 is a flow diagram showing a method for providing noise reduction by employing headset and mobile phone microphones in conjunction in accordance with an embodiment of the present invention.

Referring now to FIG. 3, a flow diagram is provided that illustrates a method 300 for using a headset microphone and mobile phone microphone to provide noise reduction to headset audio in accordance with an embodiment of the present invention. As shown at block 302, a mobile phone identifies that a headset is connected to (i.e., paired with) the mobile phone. A mobile phone microphone is turned on at block 304. The mobile phone microphone may be turned on in response to a number of different inputs. For instance, the mobile phone microphone may be turned on in response to identifying the headset being connected to the mobile phone, in response to identifying a headset microphone being turned on and capturing audio, or in response to a number of other inputs.

The gain on the mobile phone microphone is set, as shown at block 306. In embodiments, the gain on the mobile phone microphone may be set based on any of a variety of inputs, such as the level of ambient noise present and the volume of the user's voice. The gain may be set when the mobile phone microphone is initially turned on and remain at that level. Alternatively, the gain may be dynamically adjusted while the mobile phone microphone is turned on. For instance, it may be detected that the volume of the ambient noise and/or the user's voice changes as a conversation occurs, and the gain on the mobile phone microphone may be automatically adjusted based on those changes to provide optimal noise-reduction.

Mobile phones often include regular and speaker modes, in which the gain on the mobile phone microphone is set based on the mode. In some embodiments, the gain on the mobile phone microphone may be set to either regular mode or speaker mode. In other embodiments, the mobile phone may not be limited to setting the gain based on those two modes but may instead be configured to set the gain on the mobile phone microphone at any level within a range.

Audio is captured at the mobile phone microphone, as shown at block 308. Additionally, audio is received from the headset, as shown at block 310. The audio from the mobile phone microphone includes ambient noise. The audio from the headset comprises audio captured by a microphone on the headset and includes the user's voice, as well as ambient noise. In some embodiments, in addition to providing the headset audio, the headset may also provide synchronization information to the mobile phone to facilitate synchronizing the mobile phone audio with the headset audio. For instance, the synchronization information may comprise timing information regarding when the headset audio was captured that may be compared against timing data for the mobile phone audio.

Noise reduction using the audio from the mobile phone microphone and the audio from the headset microphone is performed at block 312. The result of the noise reduction process is noise-reduced audio that provides clearer voice audio from the user. As indicated previously, any of a number of different noise reduction techniques may be employed to provide noise reduction using the audio from the mobile phone microphone and the audio from the headset microphone. For instance, the noise-reduced audio may be generated by waveform subtraction of the audio from the mobile phone microphone from the audio from the headset microphone. The noise-reduction may be performed on analog or digital signals.

The noise-reduced audio is transmitted at block 314. In some embodiments, the noise-reduced audio may be transmitted from the mobile phone to a mobile telecommunications network. For instance, the user may be engaged in a voice call, and the noise-reduced audio may be transmitted to the mobile telecommunications network to be communicated to another user engaged in the voice call. In some embodiments, the noise-reduced audio may be consumed by the mobile phone. For instance, the mobile phone may have voice-command capabilities in which the user may issue commands to the mobile phone via voice. The noise-reduced audio would facilitate the voice-command capabilities of the mobile phone as the mobile phone would be more likely to recognize the voice command issued by the user based on the reduction of ambient noise.

In some embodiments, the headset and mobile phone may communicate additional data and/or commands between each other to facilitate the noise reduction process. For instance, a headset may include dual microphones for providing noise-reduction capabilities on the headset. Such noise-reduction on the headset may interfere with the noise-reduction performed by the mobile phone. Accordingly, in some embodiments, the mobile phone may instruct the headset to not perform noise-reduction using the headset's secondary microphone. In response to such an instruction, the headset may not employ the headset's noise reduction function based on its dual microphones. Instead, the headset may simply record audio from a single microphone and transmit that audio the mobile phone.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more nontransitory computer storage media storing computer useable instructions that, when used by a mobile phone, cause the mobile phone to perform a method to provide noise reduction to audio from a headset paired with the mobile phone, the method comprising:

receiving primary audio captured from a headset microphone, the primary audio including voice audio and ambient noise, wherein based on a determination that the headset includes two headset microphones for noise reduction purposes, the mobile phone instructs the headset to not employ the two headset microphones for noise reduction purposes;

receiving secondary audio captured from a mobile phone microphone, the secondary audio including ambient audio; and employing the primary audio and the secondary audio to generate a noise-reduced audio.

2. The one or more nontransitory computer storage media of claim 1, wherein the method further comprises turning on the mobile phone microphone to capture audio in response to identifying the headset being connected with the mobile phone.

3. The one or more nontransitory computer storage media of claim 1, wherein the method further comprises turning on the mobile phone microphone to capture audio in response to determining that the headset microphone is turned on and capturing audio.

4. The one or more nontransitory computer storage media of claim 1, wherein the method further comprises setting the gain on the mobile phone microphone.

5. The one or more nontransitory computer storage media of claim 4, wherein the gain on the mobile phone microphone is set to speaker mode.

6. The one or more nontransitory computer storage media of claim 4, wherein the gain on the mobile phone microphone is dynamically adjusted.

7. The one or more nontransitory computer storage media of claim 1, wherein employing the primary audio and the secondary audio to generate the noise-reduced audio comprises waveform subtraction of the secondary audio from the primary audio.

8. The one or more nontransitory computer storage media of claim 1, wherein the method further comprises communicating the noise-reduced audio from the mobile phone to a mobile telecommunications network.

9. The one or more nontransitory computer storage media of claim 1, wherein the method further comprises employing the noise-reduced audio to provide a voice command for the mobile phone.

10. A method performed by a mobile phone to provide noise reduction to audio from a headset paired with the mobile phone, the method comprising:

turning on a mobile phone microphone in response to input from the headset;

setting the gain on the mobile phone microphone;

capturing ambient audio using the mobile phone microphone;

receiving headset audio from the headset, the headset audio including voice audio with ambient noise, wherein the headset includes two headset microphones for noise reduction purposes, and wherein the mobile phone instructs the headset to not employ the two headset microphones for noise reduction purposes; and providing noise reduction to the headset audio using the ambient audio captured by the mobile phone microphone to generate noise-reduced audio.

11. The method of claim 10, wherein the input from the headset that causes the mobile phone microphone to be turned on comprises input identifying that the headset is connected with the mobile phone.

12. The method of claim 10, wherein the input from the headset that causes the mobile phone microphone to be turned on comprises input identifying that the headset microphone is turned on and capturing audio.

13. The method of claim 10, wherein the gain on the mobile phone microphone is set to speaker mode.

14. The method of claim 10, wherein the gain on the mobile phone microphone is dynamically adjusted.

15. The method of claim 10, wherein providing noise reduction to the headset audio using the ambient audio captured by the mobile phone microphone to generate the noise-reduced audio comprises waveform subtraction of the ambient audio from the headset audio.

16. The method of claim 10, wherein the method further comprises communicating the noise-reduced audio from the mobile phone to a mobile telecommunications network.

17. The method of claim 10, wherein the method further comprises employing the noise-reduced audio to provide a voice command for the mobile phone.

18. A mobile phone comprising: a short-range radio for wirelessly communicating with a headset;

a long-range radio for wirelessly communicating with a mobile telecommunications network;

a mobile phone microphone for capturing audio; and a noise reducer configured to receive primary audio and secondary audio and to generate a noise-reduced audio using the primary audio and secondary audio, the primary audio having been captured by a headset microphone on the headset and received from the headset via the short-range radio, the secondary audio having been captured by the mobile phone microphone, wherein based on a determination that the headset includes two headset microphones for noise reduction purposes, the mobile phone instructs the headset to not employ the two headset microphones for noise reduction purposes.

* * * * *